United States Patent [19]

Klein

[11] Patent Number: 5,106,286

[45] Date of Patent: Apr. 21, 1992

[54] DEVICE FOR PROVIDING A SEAL ON A DRIVE SHAFT OF AN EXTRUSION MACHINE

[75] Inventor: Heinz Klein, Pattensen, Fed. Rep. of Germany

[73] Assignee: Paul Troester Maschinenfabrik, Hannover, Fed. Rep. of Germany

[21] Appl. No.: 545,216

[22] Filed: May 31, 1990

[30] Foreign Application Priority Data

May 31, 1989 [DE] Fed. Rep. of Germany ....... 3917678

[51] Int. Cl.$^5$ .............................................. B29C 47/00
[52] U.S. Cl. ................................... 425/145; 425/146; 425/207; 425/208
[58] Field of Search ............... 425/145, 146, 171, 200, 425/205, 207, 208, 209

[56] References Cited

U.S. PATENT DOCUMENTS

| 2,722,716 | 11/1955 | Henning | 425/145 |
| 3,217,364 | 11/1965 | Genest | 425/145 |

FOREIGN PATENT DOCUMENTS

| 877197 | 5/1953 | Fed. Rep. of Germany | 425/207 |
| 2413374 | 10/1975 | Fed. Rep. of Germany | 425/207 |
| 1459496 | 12/1976 | United Kingdom | 425/207 |

Primary Examiner—Jay H. Woo
Assistant Examiner—C. Scott Bushey
Attorney, Agent, or Firm—Robert E. Burns; Emmanuel J. Lobato

[57] ABSTRACT

A seal on a drive shaft of an extrusion machine having a housing, is provided by a sealing chamber through which the shaft, for example the drive shaft of the shear spindle, extends in entering the housing, and a sealing screw thread on a portion of the shaft in the sealing chamber, the sealing screw thread having a screw direction for propelling material toward the interior of the housing. Sealing material in the form of granular plastic material is fed to the sealing chamber at a controlled rate by a device having a storage container for the granular plastic material, the bottom of the container having a funnel feeding the granular plastic material into an elongate cavity which communicates with the sealing chamber and in which the piston rod of a piston-cylinder unit is reciprocable to propel the granular plastic material into the sealing chamber. The pressure inside the sealing chamber is sensed and the operation of the piston-cylinder unit is controlled to maintain the pressure approximately constant. Fluid is circulated in a channel in the wall of the sealing chamber to keep the temperature of the chamber below the melting temperature of the granular plastic material.

14 Claims, 2 Drawing Sheets

DEVICE FOR PROVIDING A SEAL ON A DRIVE SHAFT OF AN EXTRUSION MACHINE

FIELD OF INVENTION

The invention relates to apparatus and method for sealing a shear spindle or a screw of an extrusion machine for rubber mixtures and/or plastic material, comprising a sealing screw thread arranged on the shear spindle or on the extrusion screw and a device for supplying a sealing mass to this sealing screw thread.

BACKGROUND OF THE INVENTION

In the operation of extrusion machines, screws, and still more shear spindles, give rise to the problem that the material under pressure that is to be extruded, strives to escape from the cylinder not only through the outlet provided but also through the openings through which the drive ends of the screw or the shear spindle extend. On these grounds, the clearance in these places has been held as close as possible and the screw shaft or shear spindle shaft has been provided with flat screw-like grooves of the same screw direction as the screw, or the same screw direction as the shear spindle, in order for the extrusion material entering these clearances to be returned to the extruder or the shear spindle cylinder. These flat screw-like grooves are called "sealing threads" and are known through DE-PS 1529 801.

However, a screw thread of this kind is not sufficient in many applications. Hence, possibilities have been sought to increase the sealing action of these sealing threads through the introduction of sealing means. A form of the introduction of a sealing means which is known through prior public use consists in the arrangement of a special extruder, in which powder-form plastic material is plasticized and, in this plasticized fluid form, is pressed in through a channel to the sealing thread. This fluidized plastic material works as a lubricating and sealing means and prevents the rubber mixture, that is to be extruded, from escaping in an undesired manner along the drive end of the screw or of the shear spindle. This manner of sealing has, however, two very serious disadvantages. The expense for a special extruder, even though it is of small size, is considerable and influences the initial cost and maintenance cost of the extrusion machine considerably. The feeding of the thermic fluid plastic material results in a part of this fluid plastic material being mixed with the rubber mixture to be extruded, so that this rubber mixture now contains an ingredient which does not belong.

Through the process of DE-PS 32 12 159 this kind of sealing is improved in that a cooling and a warming is undertaken of that chamber in which the part of the shear spindle or screw provided with a sealing thread rotates. The annular clearance on the side turned away from the cylinder and toward the drive is cooled so that the viscosity of the injected fluid plastic material is here higher than in the part that turned toward the cylinder. The thermo plastic fluid plastic material pressed into the annular clearance hence tends to flow out of the sealing chamber toward the drive rather than into the cylinder serving as a working space for the mass to be extruded. The production technique and mechanical difficulties are not hereby abated, but rather increased, also the entrance of the sealing mass into the material to be extruded is not avoided, but favored.

SUMMARY OF THE INVENTION

The present invention eliminates the disadvantages of the state of the art. It is the object of the present invention considerably to reduce the production technique mechanical expense, better to use the sealing mass for the sealing and to create a possibility of the least possible sealing material being permitted to enter into the material to be extruded.

The invention consists therein that the feeding device for the sealing material is a press plunger which is slidable in a cavity which is provided with a filling opening and has a direct connection to the chamber accommodating the sealing thread, whereby the sealing mass is granular plastic material.

A press plunger of this kind which is slidable in a cavity, is a simply producible, easily with conventional means drivable machine part which considerably reduces the mechanical expense for the sealing. The maintenance of this device is not only very simple, it also affords a very great decrease in maintenance time. A cleaning after the apparatus has been out of operation is not necessary. The sealing action is considerably improved because previously fluidized plastic material is not led to the sealing thread but granular plastic material, which is first melted when it is already in the sealing thread. This granular material passes through the melting phase, in which it is of very high viscosity and thereby has better sealing action than already previously fluidized plastic material. Thereby the drive of the extrusion machine is made very much simpler, the maintenance work and time are greatly reduced, a cleaning after a period out of operation can be avoided and the sealing action of the introduced sealing material is essentially increased. Thereby this apparatus can be controlled in operation so that no sealing mass is introduced into the extrudant. The extrudant is hereby improved in its quality.

Structurally, this device becomes very simple when the press plunger is formed through a front end of a rod which is slidable in the cavity with a drive for moving it in an axial direction.

Further, the contruction of this device becomes very simple when the drive for the rod comprises a servo motor, preferably a piston-cylinder unit, of which the rod is the piston rod.

Not only the construction, but also the method of operation of this apparatus becomes very simple in that the cavity in which the rod is slidable is, at the end turned away from the sealing thread, funnel shaped and preferably forms the bottom of a storage container for the sealing mass, namely the granulated plastic. The rod, which at the same time is the piston rod of the hydraulic or pneumatic servo motor, is, in operation, moved so far in the direction of the sealing thread that granular material is pressed out of the cavity. For renewed filling of the cavity with granular material, the rod is drawn back until it is outside the cavity and the granular form sealing material can fall through the funnel into the cavity. This cavity is suitably cylindrical but it can also have any desired cross sectional shape. For the movement of the rod, the required pressure is not very high. It can hence advantageously be a pneumatic drive.

It is advantageous when in or on the path of the rod there are arranged two switches of a control device for the drive of the rod. With these two switches, there is provided a control by which the rod is moved between two end positions of which one end position is close to the sealing thread and a further end position is outside the cavity and the funnel.

Moreover, it is advantageous when the sealing thread extends to both sides of the mouth of the cavity. It is advantageous when the sealing chamber is provided with a temperature control device for maintaining as uniform temperature as possible along the chamber wall whereby this temperature, preferably over the entire length of the sealing thread and both parts of the sealing thread, is below the melting point of the granules.

In order to avoid melting the granules before entry into the sealing chamber, it is advantageous when between the cavity in which the rod is slidable and the sealing chamber (and in particular its wall) there is arranged a thermic insulation.

In order to avoid the granules sticking together in the supply container, it is advantageous when a blowing device opens into the funnel or a stirring or moving device for the granules is arranged in the funnel. In this manner it is assured that there is always a uniform filling of the cavity with the granules the moment the rod is withdrawn from the cavity.

It has been shown to be advantageous when at the place of the opening of the cavity for supply of granules into the sealing thread chamber, the sealing thread is interrupted by a circumferential groove into which the granules are pressed.

It is advantageous when a measuring transmitter to measure the sealing mass discharged from the chamber and/or a pressure transmitter is arranged in the chamber and connected with the control device for the drive of the rod. With the help of such a measuring transmitter, it is easier than is possible through empirical adjustment to avoid that sealing material enters the extrudant.

The method in accordance with the invention is characterized in that granular plastic material is used as the sealing mass. The use of this granular material has not only the advantage of a simpler mechanical layout of the extrusion machine but also the advantage of achieving more effective sealing by providing a sealing mass of high viscosity, which may remain in granular form.

The amount of granular plastic sealing material pressed into the sealing thread is precisely controlled. If too much of the granular plastic material is pressed into the sealing thread, the force of the sealing mass will overcome the force exerted by the extrudant, with the result that plastic material enters the extruder. If too little of the granular plastic material is forced into the sealing threads, the force of the extrudant will overcome the force of the sealing mass, with the result that some of the extrudant will escape. Ideally the force exerted by the sealing mass should exactly equal the force exerted by the extrudant. Since this is technically impossible, the quantity of granular plastic material pressed into the sealing thread is controlled so that the force exerted by the sealing mass is equal to or slightly less than the force exerted by the extrudant. A very economical use of the plastic granules is thereby assured and, above all, it is assured that no sealing material can enter the extrudant.

Moreover, it is advantageous when the chamber accommodating the sealing thread is maintained, throughout its length, at a temperature as much as possible under the melting temperature of the granules.

BRIEF DESCRIPTION OF THE DRAWINGS

The essence of the invention will be more fully explained with reference to an embodiment of the invention shown schematically in the accompaning drawings in which.

DESCRIPTION OF PREFERRED EMBODIMENT

Figure 1:
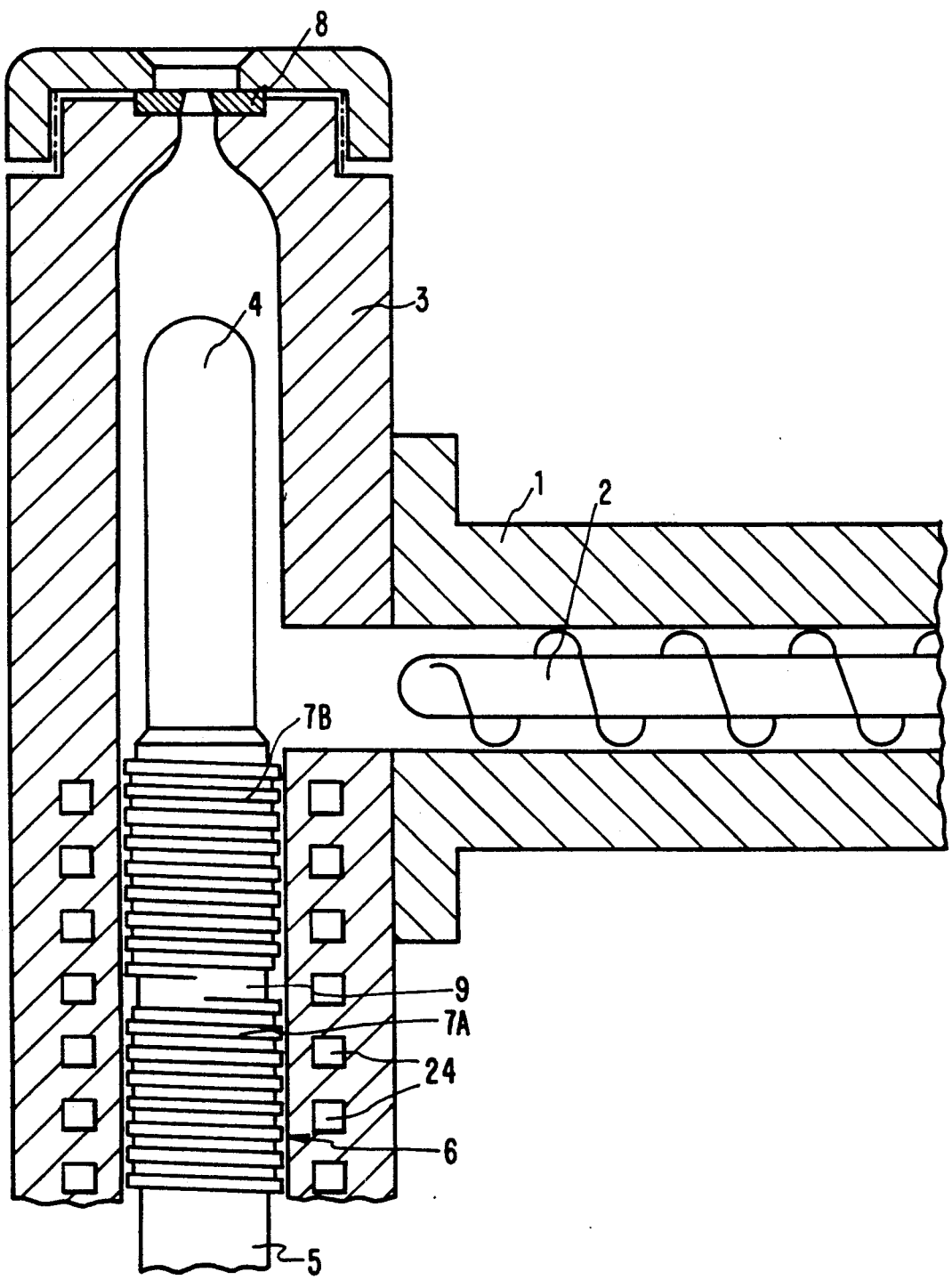
FIG. 1 is a cross section through the end of an extrusion apparatus with a sealing device in accordance with the invention shown on a shear spindle shaft.
Figure 2:
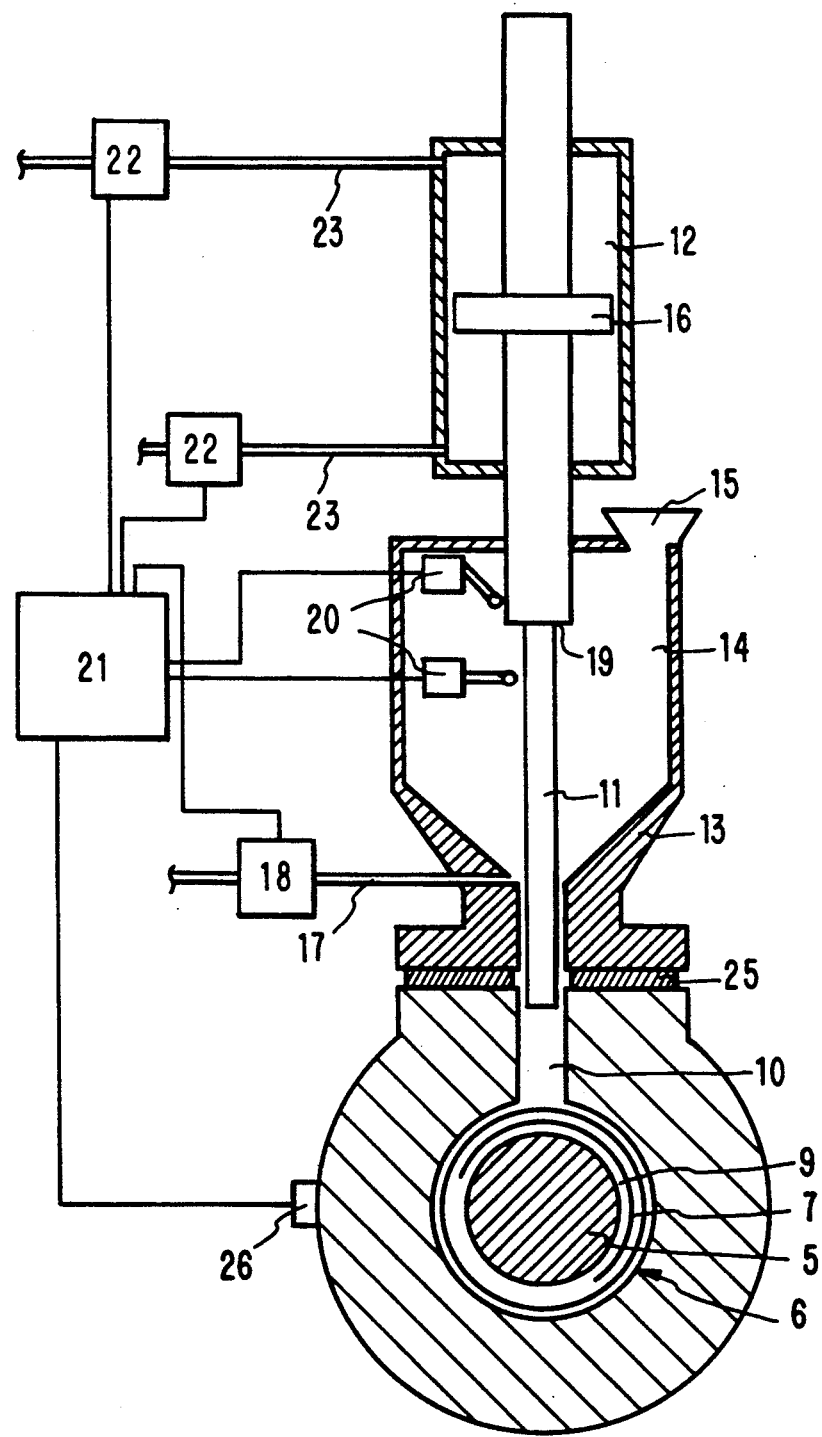
FIG. 2 is a section through the sealing device and the device for supplying the granules.

In the extruder cylinder 1 rotates the extrusion screw 2 and forwards the material to be extruded into the shear head 3, 4 of which the shear head housing 3 is flanged onto the end of the extruder cylinder 1. In the shear head housing 3 rotates the shear spindle 4 which is driven by the shear spindle shaft 5. This shear spindle shaft 5 extends through the sealing chamber 6 and, in the region of this sealing chamber 6 is provided with a sealing thread 7. This sealing thread has, with the given direction of rotation of the shear spindle 4, a forwarding action in the direction toward the extrusion tool 8. In approximately the middle of the sealing thread 7, the shear spindle shaft 5 is provided with a circumferential groove 9 which divides the sealing thread into a drive-side part 7A and a shear spindle side part 7B.

Into this circumferential groove 9 plastic granule material is pressed as the sealing material. For this purpose, there is provided a pressing-in device which comprises a cavity in the form of a pressing-in channel 10 and a pressing rod 11. This pressing rod 11 is at the same time the piston rod of a servo motor comprising a pneumatic piston-cylinder unit 12. The end of the pressing rod 11 serves as the pressing piston for pressing the granulate into the circumferential groove 9 and thereby into the sealing thread 7.

The pressing-in channel 10 is, on its end turned away from the sealing thread 7, widened into a funnel 13 which forms the bottom of a storage container 14 provided with a granulate filling opening 15. The pressing-in rod 11 is, through the piston 16 of the piston-cylinder unit 12, drawn back to a position in which the way is opened for the granulate to flow out of the strorage container 14 into the pressing-in channel 10. In order for the granulate to fall freely into the pressing-in channel 10 after withdrawal of the pressing rod 11, there is additionally provided a blowing device 17 in the form of a compressed air line 17 which opens into the funnel 13 and is controlled by a magnetic valve 18. The pressing rod 11 has a shoulder 19 which serves as the actuating means for two switches 20, which control the drive of the pressing rod 11. These switches 20 are connected with a control device 21 which serves to control the magnetic valves 22 in the compressed air lines 23 for the movement of the piston 16.

While the switches 20 are provided for controlling the press rod 11 in its end positions and are connected with the control device 21 for the movement of the press rod 11, and the magnetic valves 22 are actuated by the control device 21, the speed of the press rod 11 is controlled by a pressure sensitive transmitter 26 which likewise transmits its measured values to the control device 21, which through opening and closing of the magnetic valves 22 in the pressure lines 23 controls the forward velocity of the piston 16. With the help of this control, the speed of the press rod 11 is controlled so that a sufficient sealing mass is always present in the sealing thread 7, but no sealing medium enters the extrudant.

In order for the sealing medium always to have a suitable consistency, it is advantageous when the shear head housing 3 in the region of the sealing chamber 6 is provided with temperature control means in the form of channels 24 for a temperature control fluid. In order for the sealing material to reach the circumferential groove 9 in granular form is advantageous when a thermal insulation washer 25 is provided between the funnel 13 and the in-pressing channel 10 on the one hand and the sealing chamber 6 on the other hand.

While the invention has been illustrated as applied to the shear spindle shaft, it will be recognized that it is applicable in like manner to the drive shaft of the screw of an extrusion machine.

What I claim is:

1. A device for providing a seal on a drive shaft of an extrusion machine having a housing with an interior, said device comprising,
    a sealing chamber through which said shaft passes in entering said housing,
    a sealing screw thread on a portion of said shaft in said sealing chamber, said sealing screw thread having a screw direction, for given direction of rotation of said shaft, for propelling material toward the interior of said housing, and
    means for feeding granular plastic sealing material into said sealing chamber at a position where said sealing screw thread is located,
    said feeding means comprising an elongate cavity communicating with said sealing chamber at the location of said sealing screw thread,
    means for supplying granular plastic sealing material to said cavity,
    a pressing piston reciprocable in said cavity to propel said granular plastic sealing material from said cavity into said sealing chamber,
    means for actuating said piston, and
    means for controlling said actuating means to control the rate of feeding said granular plastic sealing material into said sealing chamber.

2. A device according to claim 1, in which said pressing piston comprises an end of a rod that is reciprocable in said cavity and in which said actuating means comprises means for reciprocating said rod.

3. A device according to claim 2, in which said actuating means comprises a servo motor comprising a piston-cylinder unit and in which said rod is a piston rod of said piston-cylinder unit.

4. A device according to claim 2, in which an end of said cavity turned away from said sealing chamber widens into a funnel which forms the bottom of a storage container for said granular plastic sealing material.

5. A device according to claim 2, in which in the path of travel of said rod there are arranged two switches actuated by reciprocation of said rod and connected with a control unit for controlling the drive of said rod.

6. A device according to claim 1, in which said sealing thread extends to both sides of the communication of said cavity with said sealing chamber.

7. A device according to claim 6, in which said shaft has a circumferential groove which is located at the communication of said cavity with said sealing chamber and which divides said sealing thread into two parts.

8. A device according to claim 1, further comprising means for controlling the temperature of said sealing chamber to maintain the sealing chamber at a selected temperature throughout its length.

9. A device according to claim 8, in which said temperature controlling means comprises a channel for the circulation of a temperature-controlling fluid.

10. A device according to claim 8, in which said temperature controlling means comprises means for maintaining said sealing chamber at a temperature below the melting point of said granular plastic sealing material.

11. A device according to claim 8, in which thermal insulation means is provided between said sealing chamber and a member in which said cavity is formed.

12. A device according to claim 4, further comprising means for agitating said granular plastic sealing material in said funnel to facilitate flow of said material into said cavity.

13. A device according to claim 12, in which said agitating means comprises means for directing a flow of air into said funnel.

14. A device according to claim 2, further comprising means for sensing pressure of said sealing material in said sealing chamber and for controlling the rate of movement of said rod to maintain the pressure in said sealing chamber approximately constant.

* * * * *